United States Patent Office 2,753,950
Patented July 10, 1956

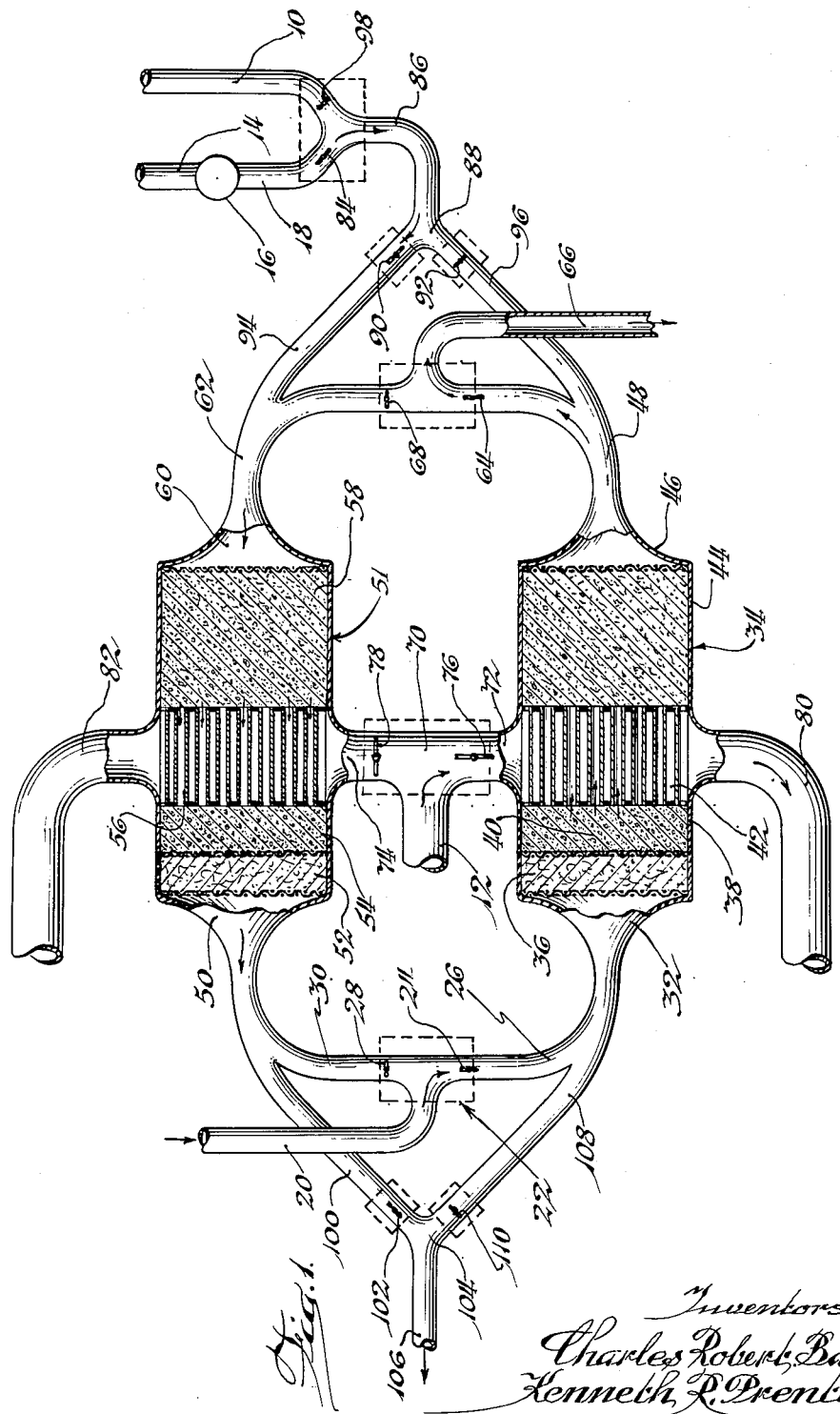

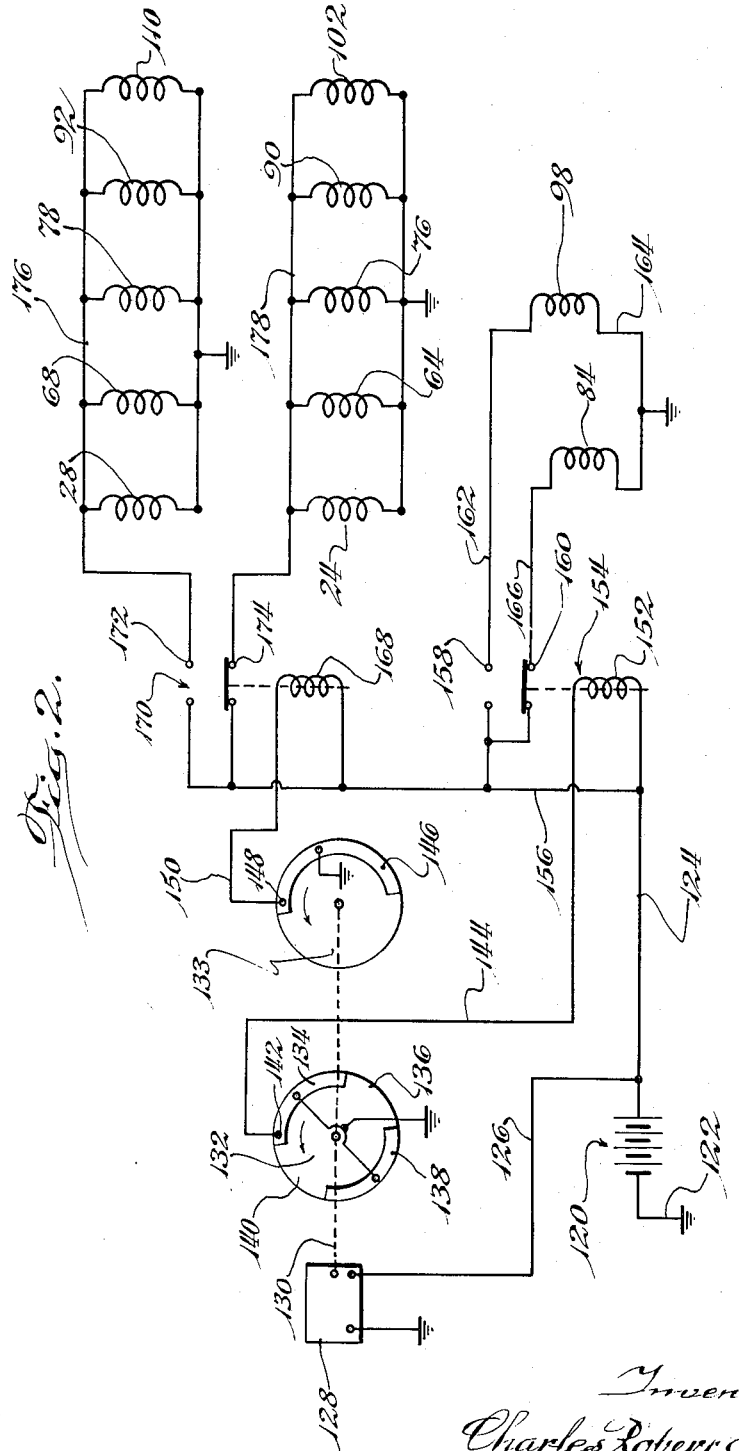

2,753,950

DRYING SYSTEM FOR PURGING GAS GENERATOR

Charles Robert Baker and Kenneth R. Prentiss, Indianapolis, Ind., assignors to Stewart-Warner Corporation, Chicago, Ill., a corporation of Virginia Application October 12, 1953, Serial No. 385,528

2 Claims. (Cl. 183—4.1)

The present invention relates to a system for drying the gases produced by a purging gas generator of the type described in patent application Serial No. 324,974 filed December 9, 1952, for "Purging Gas Generator" by Donald A. Potter and Henry A. Geisler. Improvements and variations of the purging gas generator system therein disclosed also form the subject matter of the following related patent applications: Serial No. 337,933 filed February 20, 1953, by Henry A. Geisler and Roger J. Queisser, Serial No. 340,632 filed March 5, 1953, by Henry A. Geisler and Kenneth R. Prentiss, and Serial No. 343,373 filed March 19, 1953, by Henry A. Giesler. The last three patent applications are all entitled "Freeze Prevention in Jet Aircraft Purge Gas Generators." All of the above applications, as well as the present application are assigned to the same assignee of record.

In application 324,974 a generating system is described for burning a fuel and atmospheric air mixture under controlled pressurized conditions so as to form products of combustion which are rich in carbon dioxide and nitrogen and extremely low in oxygen content. The purpose of this system is to provide substantially inert gases in considerable quantity which can be used for purging the air spaces in and around the fuel cells in jet aircraft so as to prevent the possibility of explosions or fires by the contamination of these spaces with a fuel and air mixture. The system described in the last mentioned application includes an arrangement for removing most of the carbon from the products of combustion and for condensing and removing much of the water from these gases, water as a product of combustion being present in these gases in large quantities. The gases so produced or as modified by any of the systems which form the subject matter of the other applications are suitable for this purging purpose under most conditions. The purge gases, however, are substantially saturated with water vapor when they leave the generator and upon additional cooling there will be moisture condensation in and around the fuel cells unless the temperature of the gases is kept quite high until they leave the aircraft.

It is the purpose of the present invention to provide auxiliary equipment for attachment for instance to the purge gas generating system of application 324,974, which will serve the purpose of dehydrating the purge gases so that condensation of water from these gases cannot subsequently take place. Inasmuch as it will serve no useful purpose to describe in detail a generator system for forming the purging gases, it will be assumed that the structure of application Serial No. 324,974 is representative of a type of system which is suitable for this purpose and to which the apparatus of the present invention is connected so that the purging gases pass from the generator system through the system of the present invention before being connected to the duct work leading to the fuel cells and other spaces within the aircraft where it is desired to distribute these inert gases.

The principal object of the present invention is to provide a system and the necessary structure for removing substantially all of the moisture and corrosive elements from the products of combustion produced by a jet aircraft purge gas generator.

An additional object is to accomplish the above in such manner as to make full use of the facilities easily available upon such an aircraft.

Other objects and advantages will become apparent from the following description of a preferred embodiment of our invention which is illustrated in the accompanying drawings:

In the drawings, Fig. 1 is a diagrammatic representation of the mechanical portion of a purge gas drying system embodying the features of our invention, and Fig. 2 is a simplified electrical circuit diagram thereof.

In a jet aircraft the following facilities are available which are made use of by the system of the present invention in carrying out its purpose. In any suitable fashion and in a well understood manner, a scoop or ram is located somewhere upon the aircraft so that cool outside air is taken in due to the forward movement of the aircraft. Such a ram is connected to supply atmospheric air to a duct indicated in the drawings at 10 and to a second duct indicated at 12. This can be accomplished by using a single scoop or ram connected to both ducts or if desired and more convenient, separate scoops can be provided for feeding each of these lines. Air under pressure and at elevated temperature is available from the jet engine compressor and is connected to a pipe indicated at 14. Under typical conditions this air supplied by the engine compressor, commonly known as "compressor bleed air," will be at a temperature which ranges between 340° F. and 470° F. This air will be at relatively high pressure and for the present purpose is throttled so as to constitute a source of hot air at a desired lower pressure which is sufficient to supply the required quantity to the remainder of the equipment to be described presently. For this purpose a conventional automatic pressure regulator indicated at 16 is connected to the line 14 and has its outlet side connected to a duct 18. The dam purge gases which are supplied, for instance by equipment of the type described in application Serial No. 324,974, will usually contain some acid and mercaptan substances which are corrosive and usually also will contain some fine carbon particles. This wet and somewhat contaminated, but otherwise inert gas is supplied from the purge gas generator to the pipe indicated at 20.

In addition to the above it will be seen as the description progresses that there are several electrically actuated valves which are designed to operate from the electrical system of the aircraft. All of these valves are of the quick acting type and are arranged in pairs such that whenever one of the valves of the pair opens, the other is closed. Valves of this type are commonly available and therefore need no special description. In the interest of simplicity in describing this invention, it will be assumed that all of these valves are of the type which are normally closed and which open when electrically energized. It will be appreciated of course that if desired the valves can be of the normally open type or some can be normally open and others normally closed. Further, since several valves always operate together, they can be arranged in gangs and driven together by a single actuator. The physical layout of a particular system will be the major controlling factor in attempting any such simplification of the mechanism.

Purge gases entering through the pipe 20 flow to a Y connection indicated generally at 22 where they can pass either downwardly through a valve 24 to a lower branch duct 26 or in the alternative upwardly through a valve 28 to an upper duct branch 30. Under all conditions one of the valves 24 or 28 is open and the other closed excepting momentarily during the brief interval when these valves are shifting from one position to the other.

From the lower branch duct 26 these gases flow to a transition section 32 which is connected in turn to one end of a metal canister indicated generally by the numeral 34. In a typical installation this canister will be cylindrical and of the order of eleven inches in diameter and twenty or so inches long.

At the end connected to the transition section 32 this canister contains a filtering element 36 which is preferably of the micro-filter type. This filter is for the purpose of removing solid matter from the purge gases which it will be appreciated is primarily small particles of carbon. In the typical example illustrated the purge gases pass from the filtering element 36 to a section 38 within the canister which is approximately three inches or so long and which contains silica gel 40 preferably of the type which is particularly adapted to stand high humidity. From the opposite end of the portion 38 filled with silica gel, the gases pass through a bundle of tubes 42 and into a second silica gel section 44 which typically is about nine inches long. The gases then enter a second transition section 46 which is connected at its outlet end to a duct 48.

Although it is not necessary, the silica gel in the section 44 is preferably of the type which is especially adapted to perform its drying function at comparatively high temperatures. It is preferred that the silica gel in both sections be relatively free of dust.

The purge gas upper branch duct 30 is connected to a duplicate of the canister arrangement just described and no detailed description thereof is therefore necessary. In order to avoid confusion, however, separate numerals are used to designate the several elements, as follows: The duct 30 is connected to a transition section 50 so that the gases pass into the canister 51 and through a filtering element 52, a first silica gel section 54, heat exchanger tubes 56, a second silica gel section 58, and thence into a transition section 60 connected to the duct 62 which is the counterpart of the previously mentioned duct 48.

Duct 48 is connected through a valve 64 to an outlet pipe 66 which leads to the spaces to be purged. The duct 62, the counterpart of duct 48, also leads through a valve 68 to the same outlet pipe 66. The valves 64 and 68 form one of the pairs previously referred to and operate together such that one of these valves is open whenever the other is closed. The outlet pipe 66 is therefore always connected either to the duct 48 or to the duct 62 but never to the two of them at the same time excepting during the short interval while the valves are changing position.

The tube bundles 42 and 56 constitute heat exchangers for cooling the purge gases passing through the canisters 34 and 51. They receive cooling air from the duct 12 which is connected to a T 70, the branches 72 and 74 of which are connected to pass air across the tubes in the bundles 42 and 56, respectively. In order to control this flow, the branch 72 contains a valve 76 while a similar valve 78 is in the branch 74. These two valves constitute a pair one of which is closed whenever the other is open, and as with all the valves, they are shifted from one position to another electrically.

At the opposite side of the canister 34 the air passed across the tube bundle 42 flows to an outlet duct 80 which leads overboard of the aircraft. A similar duct 82 serves a similar function with respect to the other canister 51. Cooling air entering the pipe 12, therefore, can be passed in heat exchange relation to the purge gases passing through either of the tube bundles 42 or 46, and then overboard as desired, by controlling the electric circuits of the valves 76 and 78.

The hot compressor bleed air in the previously mentioned duct 18 passing through a valve 84 and thence to a pipe 86 leading to a T fitting 88 having valves 90 and 92 in each of its outlet connections. One of these valves is closed whenever the other is open. From the T 88 hot air passing from the valve 90 enters a pipe 94 which conducts the air to the previously mentioned duct 62. A similar pipe 96 is connected to the outlet side of the valve 92 and leads to the duct 48. The cooling air duct 10 previously mentioned contains a valve 98, the downstream side of which leads to the previously mentioned pipe 86. Valves 84 and 98 constitute a pair one of which is open whenever the other is closed.

The pipe 30, which conducts the purge gases to the transition section 50 is also connected to an outlet pipe 100 which leads to a valve 102, the opposite side of which is connected to one of the branches of a T 104, another branch 106 of which leads overboard of the aircraft. Similarly, the purge gas lower branch duct 26 is connected to an outlet pipe 108 which contains a valve 110, the outlet side of which leads to the third connection of theh T 104. The valves 102 and 110 operate together so that either the pipe 100 or the pipe 108 is connected to the overboard line 106, whereas the other is shut off by either the valve 102 or the valve 110.

As was mentioned previously, each of the valves in the organization described is of the normally closed type and includes an electric actuator for opening the valve when the electrical terminals thereof are energized. In Fig. 2 of the drawings, the electrical circuit for operating the system of the present invention is shown and in the interest of convenience in reference, each of the electric valve actuators there illustrated is designated by the same numeral that is applied to the valves in Fig. 1.

In Fig. 2, which illustrates a simplified typical circuit, the electrical power system of the aircraft is designated by the battery at 120. One side of this battery is grounded as at 122, while the other side thereof is connected to a power line 124 having a branch 126 leading to one of the terminals of a low speed electric drive unit 128 the other terminal of which is grounded. The drive unit 128, which may be of any convenient and well known kind may typically comprise a small electric motor and a speed reducing gear box such that the motor drives a low speed output shaft 130 at a rate of one revolution in approximately fifty minutes.

The low speed shaft 130 drives two timing discs or a timing drum formed of insulating material, the discs being shown and indicated at 132 and 133. One of these discs, 132 has a grounded electrically conductive strip 134 near or at its periphery through an arc of 108°. This conducting strip is followed in a clockwise direction by an open space 136 of 72°. Beyond the open space 136 is another grounded conducting strip 138 extending throughout an arc of 108° and thereafter there is another 72° open space 140. As this disc is driven at a rate of one revolution in fifty minutes, it will be seen that the strip 134 will make contact with a fixed brush 142 for a period of fifteen minutes so as to ground a line 144 which is connected to this brush. Thereafter, for a period of ten minutes, the brush 142 and line 144 are ungrounded. Following this period, the strip 138 and open space 140 in turn ground the lead 144 for another period of fifteen minutes and then remove the ground for the final period of ten minutes.

As the other disc 133 rotates, a grounded arcuate strip 146 thereon which extends throughout 180°, will contact a fixed brush 148 associated therewith for a period of twenty-five minutes so as to ground this brush and a lead 150 connected thereto for this interval of time. Thereafter, the brush 148 and lead 150 are ungrounded for an equal length of time, whereupon as with the disc 132, the cycle repeats.

The relative positions of the brushes 142 and 148 and the relative positions of the two discs 132 and 133 upon the shaft 130 are such that as shown, the brush 148 will be brought into contact with the conducting strip 146 at the same time that the brush 142 is brought into contact with the strip 134 as both discs are being rotated together in a counterclockwise direction.

The lead 144 is connected to one end of a coil 152 of a relay indicated generally by the numeral 154, the other end of this relay coil being connected to the main power line 124. This relay is of the single pole, double throw type, such that when the coil 152 is deenergized the relay contacts connect a branch 156 from the main power line 124 to the relay output terminal 158. When the relay coil 152 is energized, an electrical circuit is established from the branch 156 to relay output terminal 160. Relay terminal 158 is connected by a lead 162 to one of the terminals of the electrical actuator for the valve 98, the other terminal of this valve actuator being grounded as by the lead 164. The other relay output terminal 160 is connected by a lead 166 to one of the terminals of the actuator for the valve 84, the other terminal of this actuator being grounded. Thus whenever relay coil 152 is energized valve 84 will be opened and valve 98 will be closed, whereas when relay coil 152 is deenergized valve 84 will be closed and valve 98 will be opened.

The branch power lead 156 is also connected to one end of the actuator coil 168 of a second single pole, double throw relay indicated generally by the numeral 170. The other terminal of the relay coil 168 is connected to the previously mentioned lead 150. When relay 168 is deenergized, power is supplied from the lead 156 through the relay contacts to a relay output terminal 172, whereas when coil 168 is energized, terminal 172 is deenergized and power is supplied from the lead 156 to a relay output terminal 174.

Valves 28, 68, 78, 92 and 110 are connected in parallel so that one terminal of the actuators of each of these valves is connected together by a lead 176 which is also connected to the relay terminal 72. The other terminals of all of these valve actuators are grounded. Similarly the actuators of valves 24, 64, 76, 90 and 102 are connected in parallel so that one terminal of each of these valve actuators is connected to a lead 178 which is connected in turn to the relay terminal 174. The other terminals of this last group of valves are connected together and to ground.

The condition of the circuit elements shown in Fig. 2 is the same as the condition of the several valves shown in Fig. 1. That is, the discs 133 and 132 have been rotated by the low speed drive 128 to a position such that the leads 144 and 150 have just recently been grounded. Under these conditions both relay coils 152 and 168 are energized. Thus, the relays are shifted to the positions shown, such that valves 24, 64, 76, 90, 102 and 84 are energized and therefore open, whereas valves 28, 68, 78, 92, 110 and 98 are deenergized and therefore closed.

Under these conditions, raw purge gases from the generator pass through the pipe 20, the valve 24, the lower branch duct 26, the filtering element 36 and successively the adsorber section 40, the heat exchange tubes 42, the adsorber section 44 and by way of the duct 48 and open valve 64 to the outlet line 66. Purge gases flowing to the portions of the aircraft to receive protection therefore, have the carbon particles removed therefrom by the filtering element 36 and have the water and corrosive elements removed in the adsorbers 40 and 44. Simultaneously, cool air entering through the duct 12 passes through the open valve 76 and across the heat exchange tubes 42 and then goes overboard through the duct 80. The considerable increase in temperature of the purge gases brought about by the adsorption of water therefrom is therefore counteracted so that the temperature of these purge gases is kept within a desired range and so as to make the second adsorber section 44 more effective. Inasmuch as the conductor strip 146 is connected to the brush 148 for a period of twenty-five minutes, the valves just described as being open continue to permit the purge gases to be decontaminated and cooled in the canister 134 for twenty-five minutes.

Meanwhile hot compressor bleed air entering by way of the pipe 14 has its pressure regulated to the desired level at 16 and thence passes through open valves 84 and 92 to the silica gel section 58 of the canister 51. Closed valve 98 prevents the entrance of cool air to the system and closed valve 68 prevents mixing of the incoming hot air in the line 94 with the outgoing cleaned and dried purge gases.

The hot air after passing through the silica gel section 58 enters the heat exchange tubes 56 and then passes in turn through the silica gel section 54 and filtering element 52. From the filter the air passes through the pipe 100 and open valve 102 so as to go overboard through the duct 106. The air is prevented from mixing with the incoming purge gases by the closed valve 28. Additionally closed valve 78 prevents cool air from passing across the heat exchange tube 56.

The hot air passing through the silica gel sections 58 and 54 will regenerate the gel therein by removing water and other contaminating substances which were adsorbed in these portions of the apparatus. This regenerating action continues for fifteen minutes which, in the typical example of the invention described and illustrated, is sufficient to remove substantially all of the water and acid and mercaptan substances adsorbed in these silica gel sections. Also, the reverse flow through the filtering element 52 will carry away some at least of the carbon particles caught thereon.

At the end of fifteen minutes the regeneration of the silica gel sections 54 and 58 is complete, but these sections will be at such a high temperature that they are not in condition to adsorb moisture. At this juncture the contact strip 134 is disconnected from the brush 142, thereby deenergizing relay coil 152. This shifts the position of the relay 154 so as to energize the actuator for valve 98 and deenergize the actuator for valve 84. Valve 48 therefore closes and valve 98 opens, with the result that flow continues in the same direction through the canister 51 exactly as described above, excepting that the air so flowing is cold air from the pipe 10 rather than hot air from the pipe 14. This flow of cold air continues for ten minutes. At the termination of this time interval the temperature of the silica gel in the canister 51 is reduced to a useful level. In the present typical example this temperature is about 100° F.

From the above it will be seen that at the end of a twenty-five minute cycle the adsorbing elements in one of the canisters, the canister 51, have been regenerated and cooled and are in condition to adsorb moisture and corrosive substances. At the end of this same period the silica gel section 40 and that in the section 44 have adsorbed a practical maximum amount of water and other substances from the purge gases passed therethrough.

At the termination of this twenty-five minute period the brush 142 comes into contact with the conductor strip 138 and the brush 148 moves off the conductor strip 146. The result of this is that valve 84 is opened whereas valve 98 is closed and deenergization of relay coil 168 causes the deenergization of the actuators for the valves 24, 64, 76, 90 and 102 thereby closing these valves and simultaneously energizes and opens valves 28, 68, 78, 92 and 110.

Shifting of the valves as described above causes the purge gases to flow through the valve 28, the canister 51 and through the valve 68 to the outlet pipe 66. Also cooling air flows through the valve 78 and across the heat exchange tubes 56 and passes overboard through the duct 82. Simultaneously, hot compressor bleed air passes through the valves 84, 92, canister 34 and overboard through the valve 110. At the end of fifteen minutes valve 84 closes and valve 98 opens in the manner previously described so as to substitute cold air for the hot air passing through the canister 34. Thus during this twenty-five minute interval, while carbon particles, water, and corrosive substances are being removed in the previously regenerated canister 51, the adsorbing substance in the canister 54 is regenerated and then cooled in the manner previously described with respect to canister 51.

From the above it will be seen that the system cycles on a fifty minute basis such that each of the canisters acts for twenty-five minutes to condition the purge gases, while the other canister is being regenerated and cooled, following which the other canister acts for twenty-five minutes to condition the purge gases while the first used canister is being regenerated and cooled. This cycle is repeated continuously, so long as there is a need for purge gases.

The sizes, quantities, time intervals and other specific details given above it will be appreciated apply to a typical and specific application of the present invention, and that variations will be made therefrom, depending upon the quantities of purge gases to be treated and upon the temperature and quantity of hot and cool air available for regeneration. Also of course the size and shape of the equipment and the particular arrangement of valves used will depend greatly upon the size and contour of the space available within the aircraft for housing the equipment.

Having described our invention, what we claim as new and useful and desire to secure by Letters Patent of the United States is:

1. A regenerative system for use in aircraft to clean and dehumidify purge gases, comprising, in combination, a pair of canister means forming a pair of treatment chambers each having a wet purge gas inlet and a dried purge gas outlet in opposite ends thereof, a heat exchanger in the medial portion of each chamber, means for supplying cooling air to either of said heat exchangers, a filter disposed within each chamber adjacent the inlet thereof, a gas drier in each chamber between the filter and the heat exchanger therein and formed of a regenerative water adsorbing substance of high moisture retention characteristics, a second gas drier in each chamber between the heat exchanger therein and the outlet thereof and formed of a regenerative water adsorbing substance of thorough gas drying characteristics, conduit means communicating with said treatment chamber inlets and outlets and connecting said chambers in parallel between a wet purge gas supply and a purified purge gas outlet, conduit means connecting the outlets of said respective chambers to a supply of hot regenerating air and to a supply of cooling air, and cycling means for directing during one operational phase purge gas through one of said chambers and directing cooling air over the heat exchanger therein while simultaneously blocking off the supply of purge gas and heat exchanger cooling air to the other chamber and directing hot regenerating air reversely through the other chamber for a predetermined first period and then directing cooling air through the same last mentioned chamber for the remainder of the operational phase and for shifting the gas flow connections to both chambers to shift the chambers one for the other at the end of said second period to begin successively similar operational phases, said cycling means including paired valves in said conduit means controlling the flow of purge gases, cooling air to said heat exchangers, and regenerative and cooling air, said valves being electrically controlled, and electric timing means connected to said electric valve controls.

2. A regenerative system for use in aircraft to clean and dehumidify raw purge gases comprising in combination, a system inlet connected to receive the raw purge gases and a system outlet for dried purge gases, a pair of canister means forming a pair of treatment chambers each having a wet purge gas inlet and a dried purge gas outlet in opposite ends thereof, a heat exchanger in the medial portion of each chamber, conduit means for supplying cooling air to either of said heat exchangers, paired valve means in said conduit means with one valve of said pair being open while the other valve is closed so that the heat exchanger cooling air is directed to one of said heat exchangers at any one time, a filter disposed within each chamber adjacent the inlet thereof, a gas drier in each chamber between the filter and the heat exchanger therein and formed of a regenerative water adsorbing substance of high moisture retention characteristics, a second gas drier in each chamber between the heat exchanger therein and the outlet therefrom and formed of a regenerative water adsorbing substance of thorough gas drying characteristics, inlet conduit means connecting said system inlet to said chamber inlets and outlet conduit means connecting said chamber outlets to said system outlet so that said chambers are in parallel between said system inlet and said system outlet, a pair of valves in said inlet conduit means and a pair of valves in said outlet conduit means, one valve in each pair being open while the other valve of each pair is closed so as to control and direct the flow of purge gases through a selected one of the pair of treatment chambers, conduit means connecting said chamber outlet to a supply of hot regenerative air and to a supply of cooling air and conduit means connecting said treatment chamber inlets to dump the contaminated regenerative and cooling air, a pair of valves in said regenerative and cooling air conduit means and a pair of valves in said conduit means for dumping contaminated regenerative and cooling air, one valve in each pair being closed while the other valve in each pair is open so as to control and direct the flow of regenerative and cooling air through the treatment chamber other than the selected one through which purge gas being cleansed flows, valve means in said conduit means for hot regenerative and cooling air selectively to control the flow of hot regenerative or cooling air, all of said valves having electric valve controls, an electric circuit connected to said valve controls including timing switching means, and timing means controlling said switching means whereby during one operational phase purge gas is directed through one of said treatment chambers and cooling air is directed over the heat exchangers therein, while purge gases and heat exchanger cooling air are simultaneously blocked off from the other treatment chamber, and hot regenerative air is directed reversely through the other treatment chamber for a predetermined first period, and cooling air is directed through said last mentioned treatment chamber for the remainder of the operational phase, and at the end of said second period the valves are operated to shift the gas flow connections to both chambers, thereby to shift the chambers one for the other to begin successively similar operational phases.

References Cited in the file of this patent

UNITED STATES PATENTS

| | | |
|---|---|---|
| 1,872,783 | Miller | Aug. 23, 1932 |
| 1,924,849 | Fonda | Aug. 29, 1933 |
| 2,083,732 | Moore et al. | June 15, 1937 |
| 2,519,342 | Berg | Aug. 22, 1950 |
| 2,535,902 | Dailey | Dec. 26, 1950 |
| 2,593,132 | Gannon | Apr. 15, 1952 |
| 2,664,171 | Lawler | Dec. 29, 1953 |